United States Patent [19]

Kohsaka

[11] Patent Number: 5,012,358
[45] Date of Patent: Apr. 30, 1991

[54] TRACKING CONTROL APPARATUS FOR USE WITH MAGNETIC TAPE HAVING VIDEO TRACK AND CONTROL TRACK

[75] Inventor: Yoshiaki Kohsaka, Fukaya, Japan
[73] Assignee: Kabushiki Kaisha Toshiba, Kawasaki, Japan
[21] Appl. No.: 330,285
[22] Filed: Mar. 29, 1989

[30] Foreign Application Priority Data

Mar. 31, 1988 [JP] Japan .................................. 63-76050

[51] Int. Cl.$^5$ ........................ G11B 5/52; G11B 15/467
[52] U.S. Cl. .................................. 360/70; 360/77.13
[58] Field of Search ................. 360/10.2, 10.3, 73.09, 360/73.11, 70, 77.13, 77.16, 14.2

[56] References Cited

U.S. PATENT DOCUMENTS 4,689,706  8/1987  O'Gwynn ........................ 360/14.2
4,716,473 12/1987  Kondo ............................. 360/10.3
4,725,895  2/1988  Niyamoto et al. .

FOREIGN PATENT DOCUMENTS 0181186  5/1986  European Pat. Off. .
0213549  3/1987  European Pat. Off. .

Primary Examiner—Aristotelis M. Psitos
Assistant Examiner—Steven R. Garland
Attorney, Agent, or Firm—Cushman, Darby & Cushman

[57] ABSTRACT

In a tracking control apparatus using a microcomputer, a speed signal proportional to the rotating speed of a capstan motor is generated by an FG coil and applied to a CPU and a latch in the microcomputer. Time data generated by a time counter is held by the latch every time the speed signal is generated. The CPU calculates the rotation frequency of the capstan motor in accordance with the interval of time of generation of the speed signal based on the time data. When a reference signal generated by a reference signal generator and a control signal reproduced by a control head are applied to the CPU, each time data therefor is held by a separate latch. The CPU thus calculates a phase error of the capstan motor in accordance with the difference in the time data for the reference and control signals. The CPU further calculates control data from the rotation frequency and phase error of the capstan motor. The level of a video signal reproduced by a video head is detected by a peak detector. The CPU then adjusts the control data for the capstan motor so that the level of the reproduced video signal becomes maximum.

11 Claims, 9 Drawing Sheets

```
P40/SCLK0  — 1        64 — VCC
P41/TXD0   — 2        63 — AGND
P42/RXD0   — 3        62 — VREF
P43/SCLK1  — 4        61 — P50/AN00
P44/TXD1   — 5        60 — P51/AN01
P45/RXD1   — 6        59 — P52/AN02
P46/T10    — 7        58 — P53/AN03
P47/T11    — 8        57 — P54/AN04
P30        — 9        56 — P55/AN05
P31        — 10       55 — P56/AN06
P32        — 11       54 — P57/AN07
P33/C-SYNC — 12       53 — P60/AN10
P34/EXT    — 13       52 — P61/AN11
P35/INT0   — 14       51 — P62/AN12
P36/INT1   — 15       50 — P63/AN13
P37/T0/PWM8— 16       49 — VSS
P64/CAP0   — 17       48 — X2
P65/CAP1   — 18       47 — X1
P66/CAP2   — 19       46 — RESET
P67/CAP3   — 20       45 — CLK
TEST       — 21       44 — P13/TPG23
P00/TPG00  — 22       43 — P12/TPG22
P01/TPG01  — 23       42 — P11/TPG21
P02/TPG02  — 24       41 — P10/TPG20
P03/TPG03  — 25       40 — P20/TPG10
P04/TPG04  — 26       39 — P21/TPG11
P05/TPG05  — 27       38 — P22/TPG12
P06/TPG06  — 28       37 — P23/TPG13
P07/TPG07  — 29       36 — P24/TPG14
PW0        — 30       35 — P25/TPG15
PW1        — 31       34 — P26/TPG16
VSS        — 32       33 — P27/TPG17
```

50

F I G. 4A

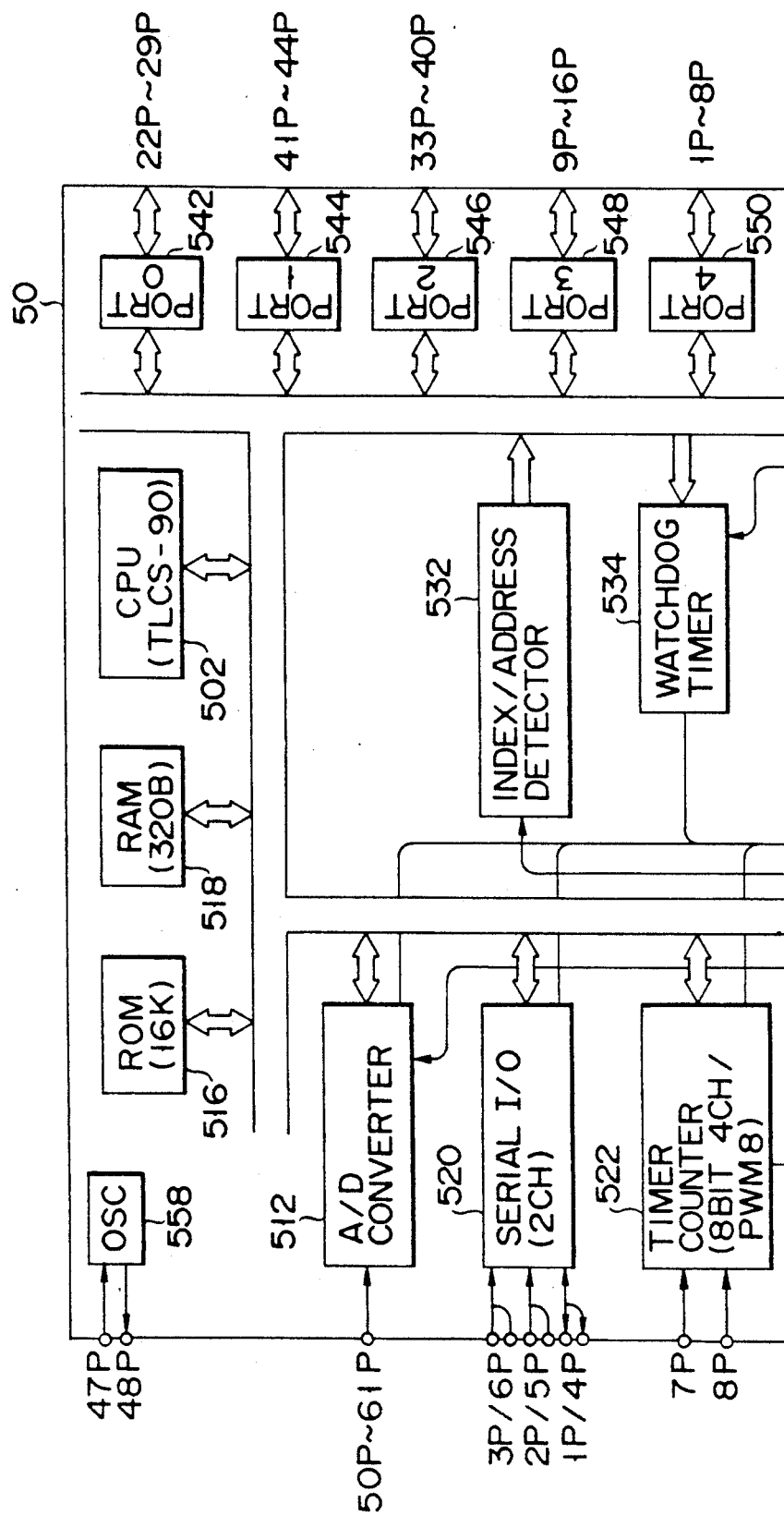
FIG. 4B-I

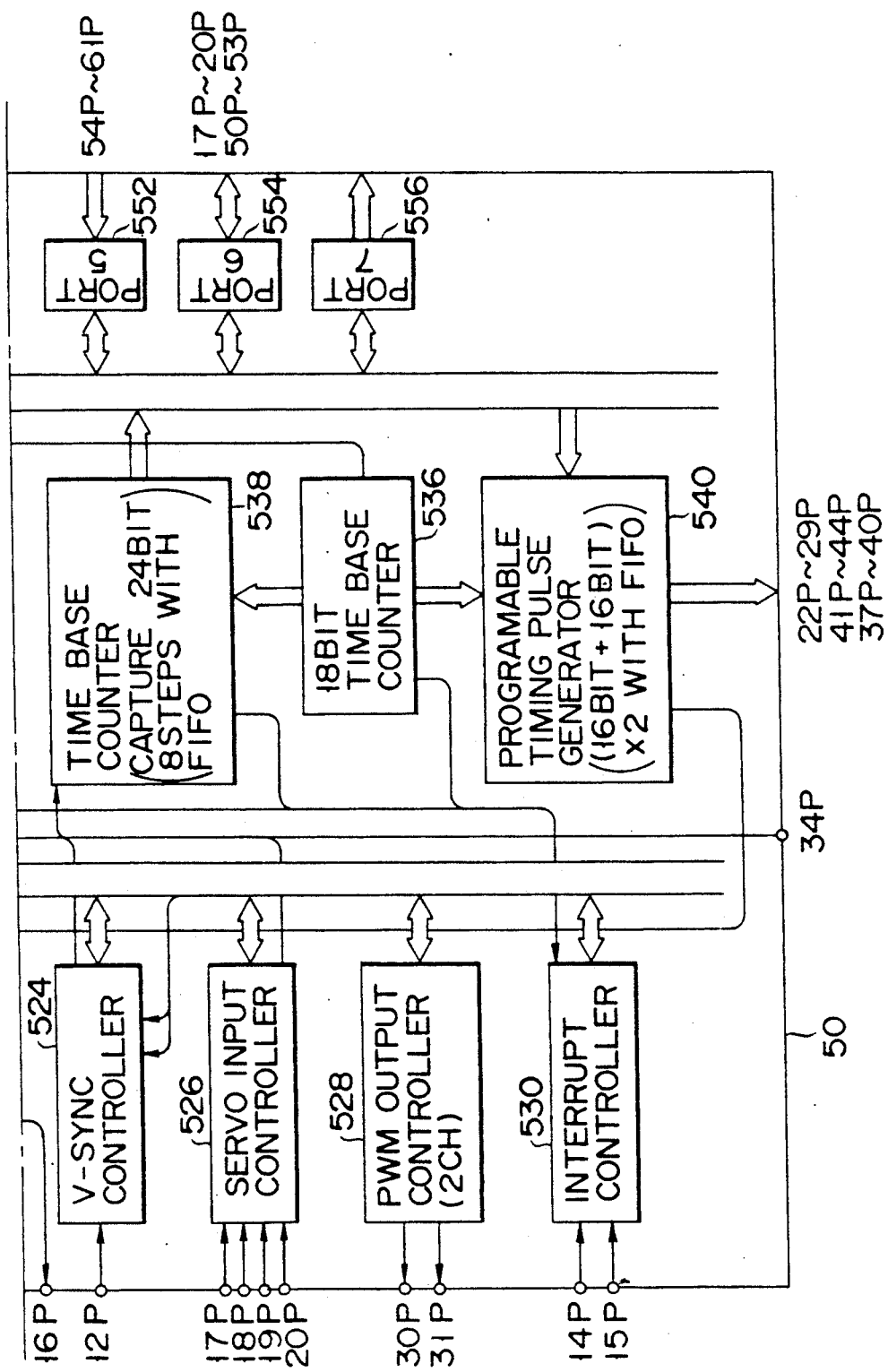
FIG. 4B-II

TRACKING CONTROL APPARATUS FOR USE WITH MAGNETIC TAPE HAVING VIDEO TRACK AND CONTROL TRACK

BACKGROUND OF THE INVENTION

1. Field of the Invention

The present invention relates to a tracking control apparatus and, more particularly, to a tracking control apparatus for use with magnetic tape having a video track and a control track in a magnetic recording and reproduction apparatus, such as a video tape recorder.

2. Description of the Related Art

In general, household video-tape recorders (referred to as VTRs hereinafter) use rotating magnetic heads for recording and reproducing video signals. These VTRs are provided with a head servo circuit for controlling rotating speed and rotation phase of the heads and a capstan servo circuit for transporting magnetic tape at constant speed at a time of recording and in synchronization with a recorded control signal at a time of reproduction. The control signal is recorded on the tape in synchronization with video signals being. However, control and video heads are different in their mechanisms. Hence the phase relationship between the control signal and the video signal varies according to mounting positions of the control head and the video heads. This variation will cause tracking error which may appear on a TV picture-tube screen at the time of reproduction of video signals.

To keep VTRs compatible, the record phase of the control signal is set up as a standard and is thus adjusted at a stage of manufacture of the VTRs. In the capstan servo circuit, on the other hand, in case where a phase shift occurs in the recorded control signal, the phase of a reference signal for a phase comparator in the servo circuit is changed by a delay circuit, thereby compensating for the phase shift of the control signal. However, such compensation is performed by a user while watching VTR reproduced pictures on a TV picture-tube screen. That is, to obtain the most pleasant pictures, the user adjusts an externally accessible variable resistor installed to a VTR body, which is called a tracking volume control, while watching the reproduced pictures.

Recently there has been proposed a method of automatically compensating for the phase shift of a control signal described above by a tracking control apparatus using a microcomputer as shown in FIG. 1. A reference signal generator 12 generates a reference signal a for controlling a capstan motor and a head-drum motor described later. The reference signal a is applied to an input port $14_1$ of a microcomputer 14 and a monostable multivibrator 16. Control head 18 is adapted to reproduce a control signal from magnetic tape. After being amplified in an amplifier 20, the reproduced control signal is applied to a Schmitt circuit 22. The reproduced control signal c wave-shaped by Schmitt circuit 22 is applied to a phase comparator 24 together with the reference signal b which has been subjected to a predetermined time delay by monostable multivibrator 16. Phase comparator 24 is adapted to make a comparison in phase between the reference signal b and the reproduced control signal c and provide to a mixing amplifier 26 an output signal d which represents the phase difference between both the signals.

An FG coil 28 generates an FG signal proportional to the rotation frequency of capstan motor 30. The FG signal is fed to an amplifier 32 for amplification. The output signal of amplifier 32 is applied to a Schmitt circuit 32 for wave-shaping and then applied to a frequency discriminator 36 as an FG signal e. Frequency discriminator 36 measures the frequency of the FG signal e and applies a speed signal f to mixing amplifier 26 accordingly. Mixing amplifier 26 mixes the phase difference signal d and the speed signal f together to produce a motor control signal g which is fed to a motor drive amplifier 38. Motor drive amplifier 38 amplifies the motor control signal g to provide a signal for rotating capstan motor 30.

A video signal reproduced by a video head 40 is applied to a peak detector 44 via a preamplifier 42, which detects a peak level of the reproduced video signal for application to an A/D conversion input port $14_2$ of microcomputer 14.

Microcomputer 14 converts an output of peak detector 44 to a digital signal. A transistor 46 is connected to an output port $14_3$ of the microcomputer 14 via a resistor $R_1$ as shown in FIG. 1.

Monostable multivibrator 16 comprises NAND gates 162, 164, a comparator 166, a transistor 168, a resistor R and a capacitor C forming together a delay circuit, a resistor $R_2$ and a capacitor $C_1$. NAND gate 162 has an input connected to reference signal generator 12 and the other input connected to the output of NAND gate 164. NAND gate 162 has an input connected to the output of NAND gate 162 and the other input connected to the output of comparator 166. NAND gate 164 provides reference signal b to phase comparator 24 and to transistor 168 via resistor $R_2$. Comparator 166 has its noninverting input (+) connected to ground via capacitor $C_1$ and its inverting input (−) to the junction of resistor R and capacitor C, which is also connected to transistor 46.

In operation, reference signal a generated by reference signal generator 12 at time $t_1$ as shown in FIG. 2A is applied to microcomputer 14 and monostable multivibrator 16. In monostable multivibrator 16, reference signal a is delayed by the delay circuit formed of resistor R and capacitor C, the delay time depending on a time constant defined by resistance and capacitance values. In response to the trailing edge of reference signal a, transistor 168 in monostable multivibrator 16 is turned off and output port 143 of microcomputer 14 goes high, thereby causing transistor 46 to be turned on as shown in FIG. 2B. The inverting input (−) of comparator 166 thus goes low so that the output thereof becomes high. Therefore the NAND gate 164 goes low as shown in FIG. 2D.

Microcomputer 14 receives the output of peak detector 44 at input port 142 and causes output port $14_3$ to go high when a peak level is detected with the result that transistor 46 is turned off (time $t_2$). The time interval between $t_1$ and $t_2$ is a delay time for the reproduced signal to attain the maximum level. As a result of transistor 46 being turned off, such a pulse as shown in FIG. 2C is applied to the inverting input (−) of comparator 166. The pulse rises in accordance with the time constant defined by resistor R and capacitor C in the monostable multivibrator 16, thereby causing the output of comparator 166 to go low. Consequently the output of NAND gate 164 goes high at time $t_3$ as shown in FIG. 2D. Once the output of NAND gate 164 goes high, transistor 168 is turned on, so that the high level output of NAND gate 164 is held until reference signal a next goes low at time t4 as shown in FIG. 2D.

Thus reference signal b output from NAND gate 164 is kept in sync with the peak level of the reproduced video signal detected by microcomputer 14. Hence the rotation phase of capstan motor 30 is fixed at a time when the peak level is detected, thereby completing the tracking adjustment.

According to the tracking adjustment method described above, however, the operating point of monostable multivibrator 16 is delayed by microcomputer 14. Consequently there arises a problem that synchronizing error occurs because the amount of delay has to be internally generated by microcomputer 14.

Moreover, there is another problem that the connection of microcomputer 14 to the servo system increases the component count and manufacturing cost.

SUMMARY OF THE INVENTION

It is accordingly an object of the present invention to provide a tracking control apparatus which eliminates the synchronizing error for improved tracking accuracy and decreases the component count for reduction in manufacturing cost.

According to an aspect of the present invention there is provided a tracking control apparatus for use with magnetic tape having a video track and a control track, comprises a capstan motor adapted to be rotated at a predetermined speed to transport the magnetic tape at a constant speed, timer means for providing time data, speed signal generating means for generating a speed signal corresponding to the rotating speed of the capstan motor in accordance with the time data, reference signal generating means for generating a predetermined reference signal in association with the time data, control signal reproducing means for reproducing a control signal from the control track of the magnetic tape in association with the time data, video-signal reproducing means for reproducing a video signal from the video track of the magnetic tape in association with the time data, level detecting means for detecting a predetermined level of the video signal reproduced by the video-signal reproducing means, and microprocessor means for calculating the rotating speed and rotating phase error of the capstan motor in accordance with the speed signal from the speed signal generating means, the time data provided from the timer means and the reference signal from the reference signal generating means and providing to the capstan motor control data so that the level of the video signal obtained from the level detecting means may become maximum.

According to another aspect of the present invention there is provided a tracking control apparatus for use with magnetic tape having a video tack and a control track, comprises a capstan motor adapted to be rotated at a predetermined speed to transport the magnetic tape at a constant speed, speed signal generating means for generating a speed signal corresponding to the rotating speed of the capstan motor, timer means for providing time data, frequency calculating means for calculating the rotation frequency of the capstan motor in accordance with an interval of time of generation of the speed signal based on the time data provided from the timer means, reference signal generating means for generating a predetermined reference signal in association with the time data, control signal reproducing means for reproducing a control signal from the control track in association with the time data, phase error calculating means for calculating a rotation phase error of the capstan motor on the basis of the difference between time data provided from the timer means when the reference signal is generated by the reference signal generating means and time data provided from the timer means when the control signal is reproduced by the control signal reproducing means, control data calculating means for calculating control data for the capstan motor from the rotation frequency and the rotation phase error of the capstan motor, video-signal reproducing means for reproducing a video signal from the video track of the magnetic tape, level detecting means for detecting a predetermined level of the video signal reproduced by the video-signal reproducing means, and means for providing to the capstan motor the control data so that the level of the video signal detected by the level detecting means becomes maximum.

BRIEF DESCRIPTION OF THE DRAWINGS

The aforementioned aspects and other features of the present invention are explained in the following description, taken in connection with the accompanying drawings in which:

FIGS. 4A, and 4B-I and 4B-II are a pin layout and a functional block diagram, respectively, of the microcomputer of FIG. 3.

DETAILED DESCRIPTION OF THE PREFERRED EMBODIMENT

Figure 1:
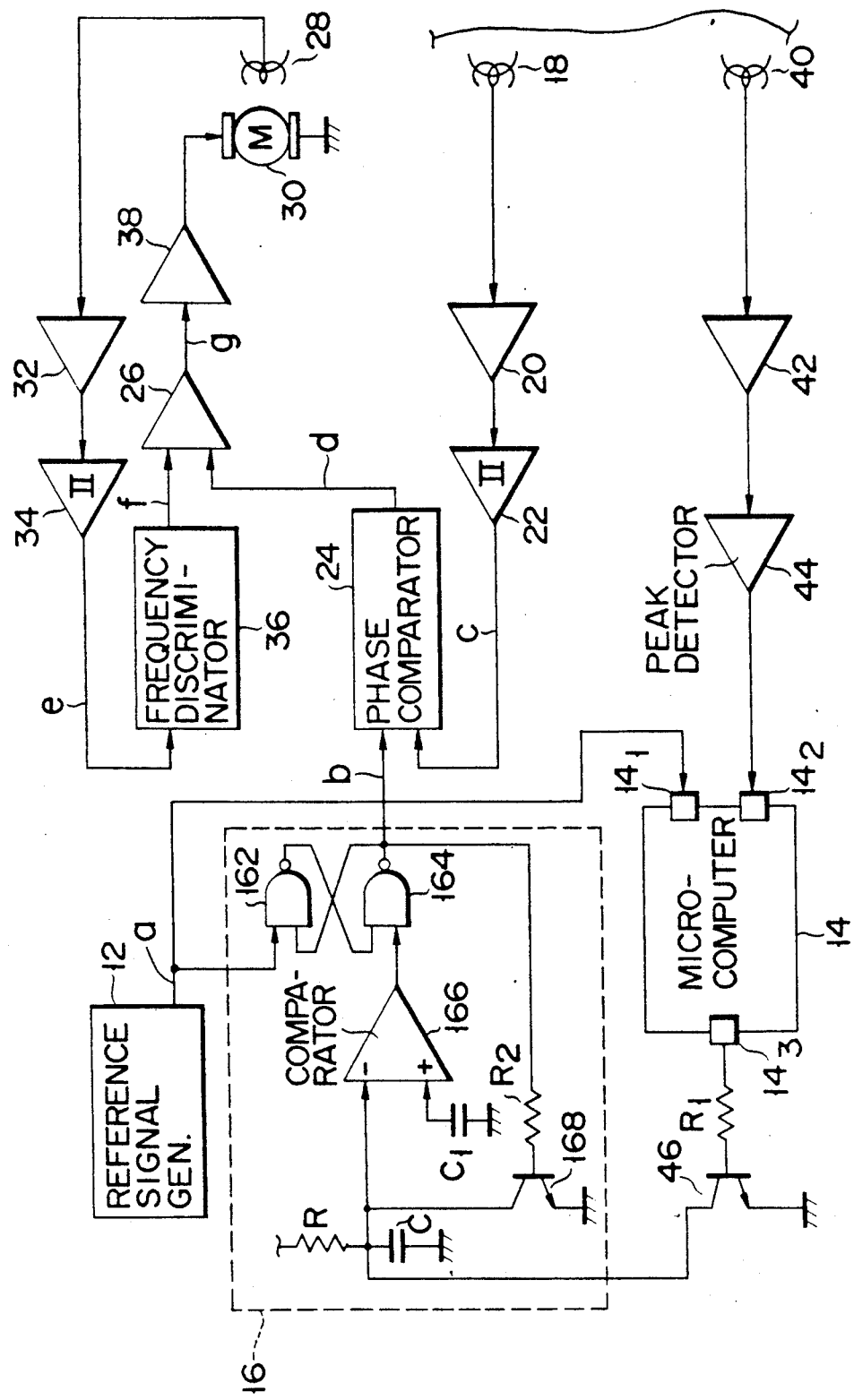
FIG. 1 is a block diagram of a prior art tracking control apparatus.
Figure 2:
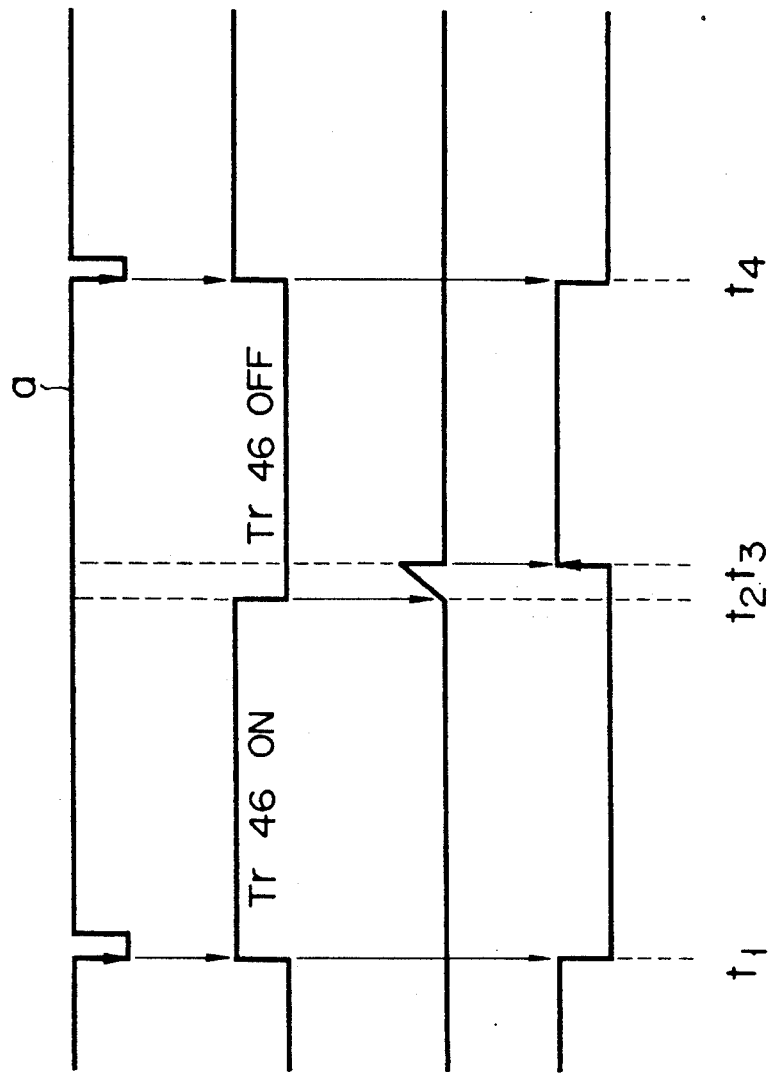
FIGS. 2A through 2D are timing diagrams which are useful in understanding the operation of the prior art tracking control apparatus of FIG. 1.

An embodiment of the present invention will be described below by reference to FIGS. 3 through 8 in which like reference characters designate like or corresponding parts in the prior art.

Figure 3:
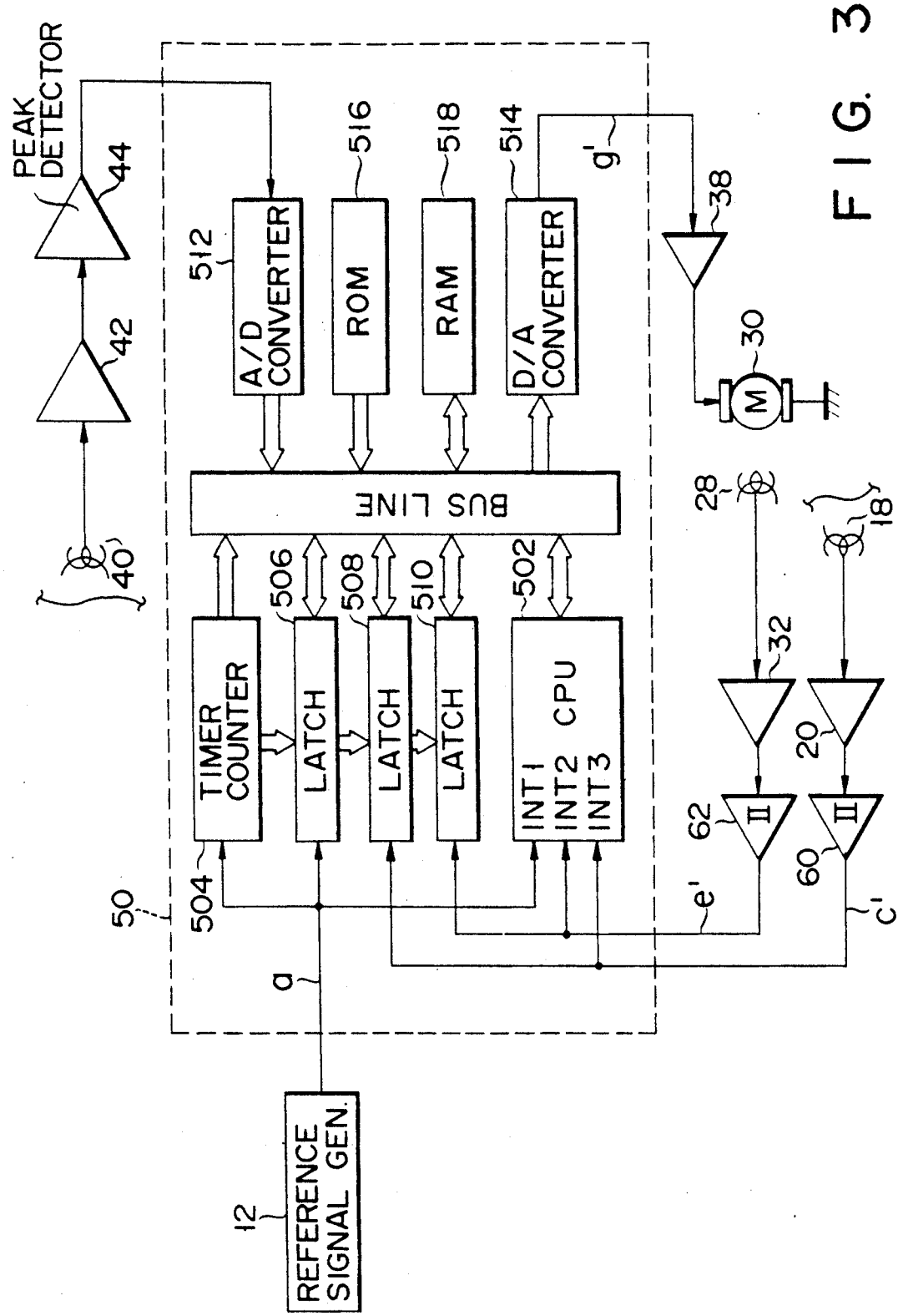
FIG. 3 is a block diagram of a tracking control apparatus embodying the present invention.

In FIG. 3, reference numeral 50 designates a microcomputer formed of the Toshiba TMP91C642 microprocessor, for example. Its pin layout and internal block diagram are shown in FIG. 4A and FIGS. 4B-I and 4B-II, respectively. The microcomputer 50 comprises a central processing unit (CPU) 502 for performing required processing, a timer counter 504 for counting a signal delivered from external reference signal generator 12, latches 506, 508 and 510 which latch values counted by the timer counter 504, an analog-to-digital (A/D) converter 512 for converting an output signal of video head 40 to a digital value, a digital-to-analog (D/A) converter 514 for converting a signal to be applied to capstan motor 30 to an analog signal, a ROM (read-only memory) 516 and a RAM (random access memory) 518. Various pieces of data can be transferred among these components via a bus line as shown in FIG. 3.

Microcomputer 50 has the construction shown in FIGS. 4B-I and 4B-II. As is shown in FIGS. 4B-I and 4B-II, CPU (TLCS-90) 502, A/D converter 512, ROM (16K) 516, and RAM (320B) 518 are coupled to one another through a bus line. To this bus line, the following structural elements are also coupled: serial I/0 (2ch) 520 through which data is supplied from or to an external device; timer counter (8 Bit, 4 CH/PWM8) 522 having a timer function of counting internal clocks and an event function of counting the number of pulses externally input; V-synchronous controller 524 having a V-separation function of separating a C-synchronous input (from 12P) to a V-Sync. and also a function of determining whether the C-Sync. input is an even-numbered field or an odd-numbered field and whether it is a NTSC or PAL/SECAM (60/50 field); and servo input controller 526 including a D-FG frequency dividing circuit for varying the D-APC sampling, a C-FG frequency dividing circuit for performing the picture search frequency division in accordance with the number which is double the search speed, a C-FG mask counter, and a P-CTL frequency dividing circuit. Further, the following structural elements are coupled to the bus line: PWM output controller (2ch) 528 for controlling the motor by modulating a digital amount into a pulse width (resolution: 12 bits) and deriving an analog voltage by causing the pulse width to pass through a low-pass filter; interrupt controller 530 for controlling the interrupting signal supplied through an external I/O; Index/Address detector 532 for detecting the duty of a reproduced control signal, an index (VHS type), and an address (VHS type); and watchdog timer 534 which includes a timer for detecting an erroneous operation of CPU 502 and which resets CPU 502 after the elapse of a predetermined time.

A 18-bit time base counter 536 is a 18-bit up counter which counts the internal clocks (200 msec at the time of 10 MHz oscillation). This watchdog timer 534 is coupled to both time base counter 538 and programmable timing pulse generator 540 through a bus line, and is further coupled to the above-mentioned bus line. Time base counter 538 is a 24-bit, 8-step element with FIFO. It has a function of latching a counted value at the edge of an externally supplied signal and can measure the period of each input signal on the basis of the latched data. Programmable timing pulse generator 540 is an element of (16 bit +16 bit) ×2 and is provided with FIFO. Generator 540 can output pulses (20 pulses at the maximum) at timings which are synchronous with 18-bit time base counter 536, so that it produces highly accurate timing pulses in synchronism with capture inputs.

Programmable timing pulse generator 540 constitutes reference signal generator 12 shown in FIG. 3, in conjunction with V-Sync. controller 524. Servo input controller 526 is a section where P-CTL signal c' and C-FG signal e' are input. Further, 18-bit time base counter 536 is a section corresponding to timer counter 504, and time base counter 538 is a section corresponding to latches 506, 508 and 510.

Reference numerals 542, 544, 546, 548, 550 and 554 denote input/output ports, reference numeral 552 denotes an input port, reference numeral 556 denotes an output port. Reference numeral 558 denotes an oscillator for generating signals used for the interface of input/output communication.

Reference signal a generated by reference signal generator 12 is applied to CPU 502 and latch 506. A signal reproduced by control head 18 and amplified by amplifier 20 is applied to CPU 502 and latch 508 as a P-CTL signal c' after being subjected to wave-shaping in Schmitt circuit 60. Similarly, an FG signal generated by FG coil 28, which is proportional to the rotating speed of capstan motor 30, is applied to CPU 502 and latch 510 as a C-FG signal e' after amplification in amplifier 32 and subsequent wave-shaping in Schmitt circuit 62.

A video signal reproduced by video head 40 is amplified by preamplifier 42 and then applied to A/D converter 512 via peak detector 44. An output signal of D/A converter 514 is amplified by motor drive amplifier 38 and then applied to capstan motor 30.

The operation of the embodiment will now be described with reference to flowcharts of FIGS. 5 through 8.

Figure 5:
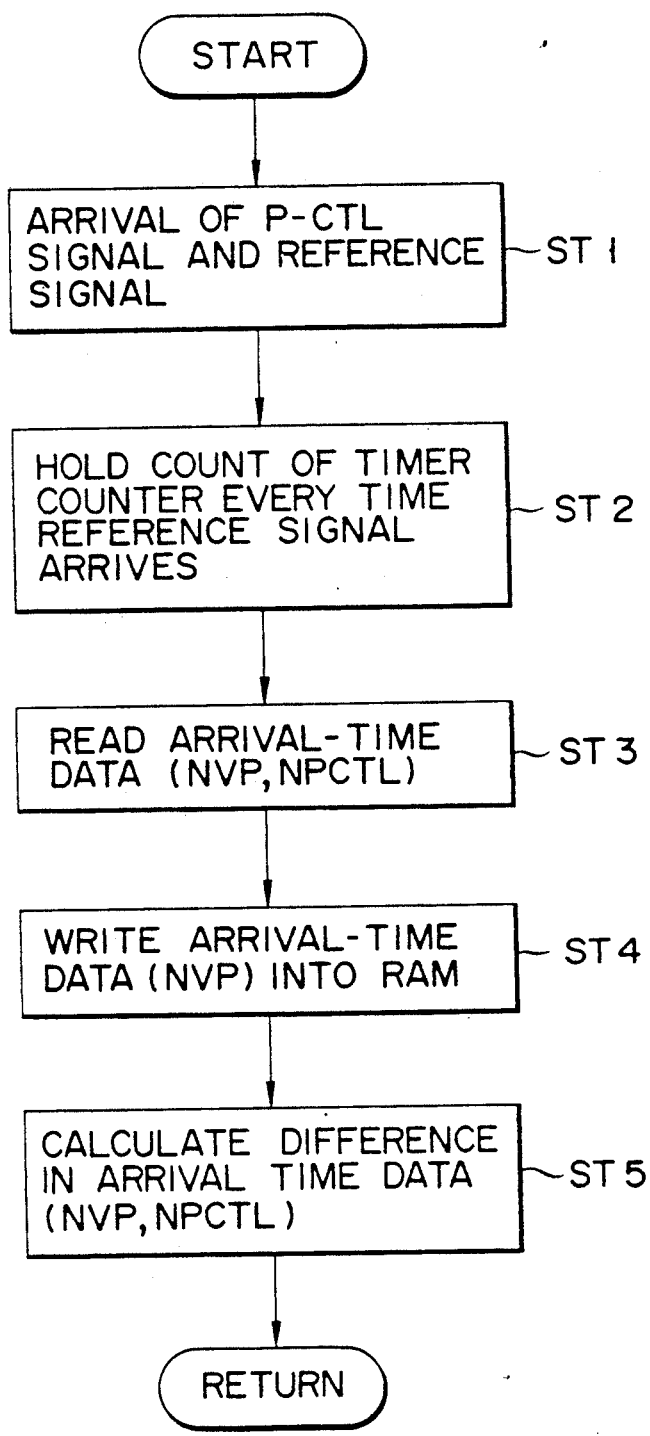
FIGS. 5 through 8 are flowcharts which are useful in understanding the operation of the tracking control apparatus of FIG. 3, more specifically, FIG. 5 illustrating steps for phase comparison, FIG. 6 illustrating steps for frequency discrimination, FIG. 7 illustrating steps for tracking control and FIG. 8 illustrating steps for capstan motor control.

The control signal reproduced by control head 18 is amplified by amplifier 20 up to a predetermined level and then applied to Schmitt circuit 60. The amplified control signal is wave-shaped by Schmitt circuit 60 to P-CTL signal c'. Here the function of phase comparison will be described. As shown in FIG. 5, P-CT1 signal c' and reference signal a generated by reference signal generator 12 arrive at microcomputer 50 (step ST1). Reference signal a is applied to CPU 502 and latch 506 and P-CTL signal c' is applied to CPU 502 and latch 508. Every time reference signal a arrives at microcomputer 50, CPU 502 causes latch 506 to hold the count of timer counter 504 as data representing reference signal's time of arrival at the microcomputer. Similarly, every time P-CTL signal c' arrives at microcomputer 50, CPU 502 causes latch 508 to hold the count value (data representing P-CTL signal's time of arrival) of timer counter 504 (step ST2). CPU 502 thus reads arrival-time data (counts of the timer counter) from latches 506 and 508 and then writes the arrival-time data (NVP) read from latch 506 into RAM 518 (step ST4). Subsequently CPU 502 calculates the difference between the arrival-time data (NVP) of reference signal a, which has been written into RAM 518, and the arrival-time data (NPCTL) of P-CTL signal c' read from latch 508 (step ST5). This difference corresponds to the phase difference between reference signal a and P-CTL signal c'. The operation of phase comparison is thus achieved.

Figure 6:
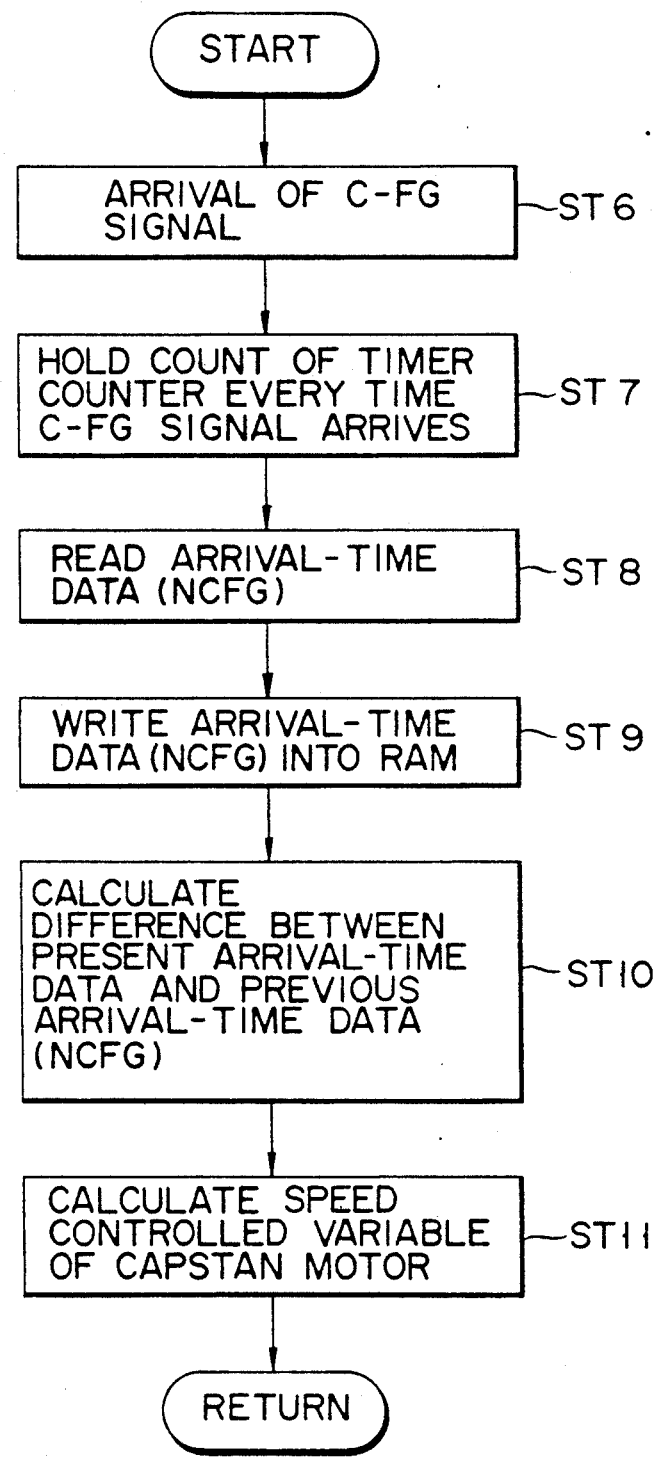

The FG signal generated by FG coil 28 is amplified by amplifier 32 and then wave-shaped by Schmitt circuit 62. As a result, C-FG signal e' proportional to the rotation frequency of capstan motor 30 is formed. In operation of frequency discrimination, as shown in FIG. 6, upon arrival at microcomputer 50 (step ST6), C-FG signal e' is entered to CPU 502 and latch 510. Every time C-FG signal e' arrives at microcomputer 50, CPU 502 causes latch 510 to hold the count of timer counter 504 (step ST9). Upon arrival of C-FG signal e', CPU 502 reads the arrival-time data of signal e' from latch 510 (step ST8). Subsequently CPU 502 writes the time data read from latch 510 into RAM 518 (step ST9). CPU 502 then calculates the difference between two successive pieces of arrival-time data of C-FG signal e', one of which being now written into RAM 518 and the other of which having been written thereinto previously (step ST10). In step ST11, CPU 502 calculates the controlled variable in phase of capstan motor 30 from the difference in time data calculated in step ST10. An interval between successive times of arrival of signal C-FG signal e' can be found in this way. CPU 502 detects the frequency of C-FG signal e', thereby achieving the operation of frequency discrimination.

CPU 502 mixes the speed error and the phase error together, which are obtained by the above described operations, in accordance with a predetermined arithmetic operation to produce motor control signal g' which is adapted to rotate capstan motor 30 in predetermined phase and at predetermined speed. Motor control signal g' is converted to an analog signal by D/A converter 514 and then applied to motor drive amplifier 38 for amplification. The amplified motor control signal from motor drive amplifier 38 drives capstan motor 30.

The video signal reproduced by video head 40 is amplified by preamplifier 42 and then applied to peak detector 44. Peak detector 44 detects a peak value of the input video signal, which is entered to microcomputer 50.

Figure 7:
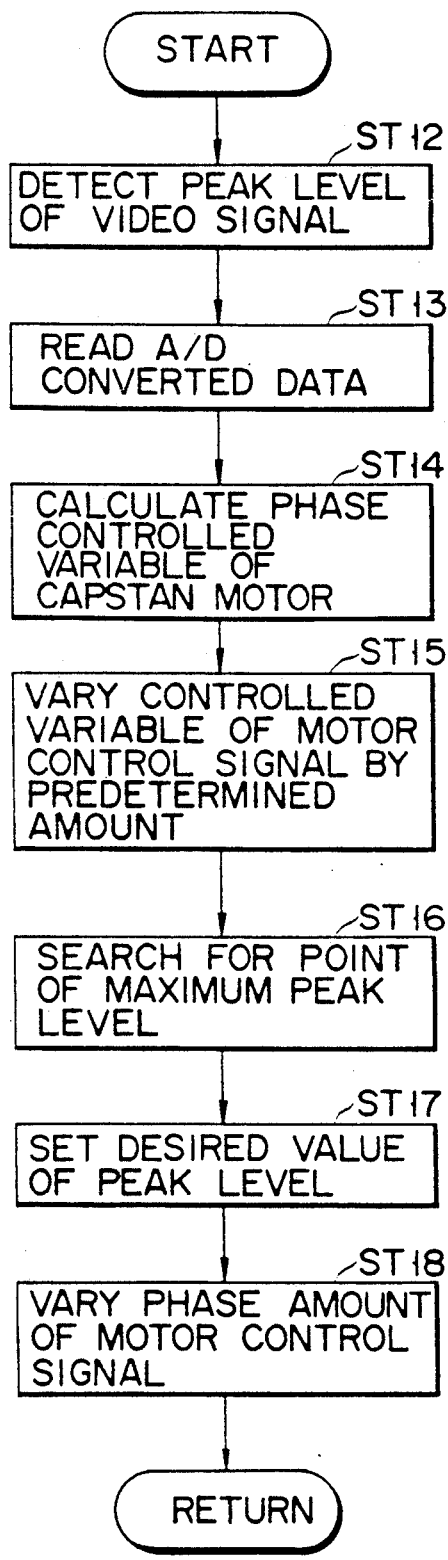

The tracking control operation will now be described with reference to FIG. 7. When the peak level of a video signal being reproduced is detected by peak detector 44, the detected peak level is entered to A/D converter 512 (step ST12). CPU 502 reads the peak level of the video signal being reproduced via A/D converter 512 (step ST13). Subsequently CPU 502 calculates the phase controlled variable of motor 30 so that the peak level may become maximum (step ST14).

At the same time, CPU 502 varies the controlled variable of the motor control signal by a predetermined amount in accordance with the amount of phase error obtained by the phase comparison operation in steps ST1-ST5 (step ST15). CPU 502 then reads, as described above, the peak level of the reproduced video signal after the controlled variable is varied and searches for a point at which the peak level becomes maximum (step ST16). If the point at which the peak level becomes maximum has thus been found, CPU 502 sets the maximum peak level at a desired value (step ST17). CPU 502 varies the controlled variable of the motor control signal so that the desired value may be attained (step ST18). The tracking control is achieved in this way.

Figure 8:
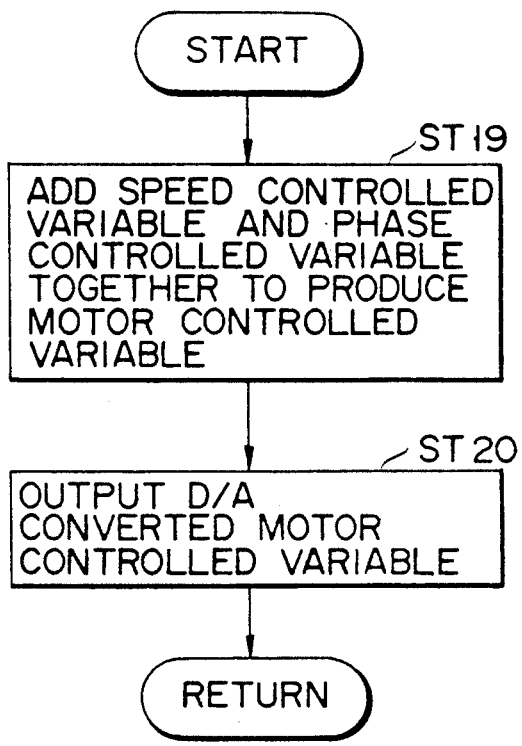

Referring to FIG. 8, the control operation of capstan motor 30 is as follows. The speed controlled variable of capstan motor 30 calculated in step ST11 and the phase controlled variable of motor 30 calculated in step ST14 are added together to produce a motor controlled variable (step ST19). The motor controlled variable is subsequently converted to an analog signal by D/A converter 514 for application to motor drive amplifier 38 as motor control signal g, (step ST20). Capstan motor 30 is responsive to the output of motor drive amplifier 38 to rotate at the predetermined phase and the predetermined speed.

According to the tracking control apparatus arranged as above, CPU 502 in microcomputer 50 controls the speed and phase of capstan motor 30 by means of its phase comparison and frequency discrimination functions and moreover controls the rotation phase of capstan motor 30 to perform proper tracking control.

What is claimed is:

1. A tracking control apparatus for use with magnetic tape having a video track and a control track, comprising:
   a capstan motor adapted to be rotated at a predetermined speed to transport the magnetic tape at a constant speed;
   timer means for providing time data;
   speed signal generating means for generating a speed signal corresponding to the rotating speed of said capstan motor in accordance with the time data;
   reference signal generating means for generating a predetermined reference signal in association with the time data;
   control signal reproducing means for reproducing a control signal from the control track of the magnetic tape in association with the time data;
   video-signal reproducing means for reproducing a video signal from the video track of the magnetic tape in association with the time data;
   level detecting means for detecting a predetermined level of the video signal reproduced by said video-signal reproducing means; and
   microprocessor means for calculating the rotating speed and rotating phase error of said capstan motor in accordance with the speed signal from said speed signal generating means, the time data provided from said timer means and the reference signal from said reference signal generating means and providing to said capstan motor control data so that the level of the video signal obtained from said level detecting means may become maximum.

2. An apparatus according to claim 1, wherein said microprocessor means comprises:
   a first calculating section for calculating the rotation frequency of said capstan motor in accordance with a time interval of generation of the speed signal from said speed signal generating means which is based on the time data from said timer means;
   a second calculating section for calculating the difference between time data from said timer means that corresponds to a reference signal from said reference signal generating means and time data that corresponds to a control signal from said control signal reproducing means to obtain the rotation phase error of said capstan motor;
   a third calculating section for calculating the control data for said capstan motor in accordance with the rotation frequency and the rotation phase error calculated by said first and second calculating means; and
   an output section for providing to said capstan motor the control data calculated by said third calculating section so that the level of the video signal detected by said level detecting means becomes maximum.

3. An apparatus according to claim 2, further comprising hold means for temporarily holding the time data provided from said timer means; and wherein said microprocessor means calculates the rotation frequency of said capstan motor in accordance with the interval of time of generation of the speed signal based on the time data temporarily held in said hold means, and calculates the rotation phase error of said capstan motor on the basis of the difference in the time data temporarily held in said hold means in accordance with the reference signal and the control signal.

4. An apparatus according to claim 3, wherein said hold means comprises first, second and third hold means for holding the respective time data for the speed signal, reference signal and control signal.

5. An apparatus according to claim 3, further comprising storage means for storing the time data temporarily held in said hold means; and wherein said microprocessor means calculates the rotation frequency of said capstan motor in accordance with the interval of time of generation of the speed signal based on the time data stored in said storage means and calculates the rotation phase error of said capstan motor on the basis of the difference in time data stored in said storage means for the reference signal and control signal.

6. An apparatus according to claim 2, further comprising analog-to-digital conversion means for converting the recorded signal detected by said level detecting means to a digital signal; and digital-to-analog conversion means for converting the control data calculated by said microprocessor means to an analog signal for application to said capstan motor.

7. A tracking control apparatus for use with magnetic tape having a video tack and a control track, comprising:

a capstan motor adapted to be rotated at a predetermined speed to transport the magnetic tape at a constant speed;

speed signal generating means for generating a speed signal corresponding to the rotating speed of said capstan motor;

timer means for providing time data;

frequency calculating means for calculating the rotation frequency of said capstan motor in accordance with an interval of time of generation of the speed signal based on the time data provided from said timer means when the speed signal is generated;

reference signal generating means for generating a predetermined reference signal in association with the time data;

control signal reproducing means for reproducing a control signal from the control track in association with the time data;

phase error calculating means for calculating a rotation phase error of said capstan motor on the basis of the difference between time data provided from said timer means when the reference signal is generated by said reference signal generating means and time data provided from said timer means when the control signal is reproduced by said control signal reproducing means;

control data calculating means for calculating control data for said capstan motor from the rotation frequency and the rotation phase error of said capstan motor;

video-signal reproducing means for reproducing a video signal from the video track of the magnetic tape;

level detecting means for detecting a predetermined level of the video signal reproduced by said video-signal reproducing means; and means for providing to said capstan motor the control data so that the level of the video signal detected by said level detecting means becomes maximum.

8. An apparatus according to claim 7, further comprising hold means for temporarily holding the time data provided from said timer means; and wherein said frequency calculating means calculates the rotation frequency of said capstan motor in accordance with the interval of time of generation based on the time data temporarily held in said hold means, and said phase error calculating means calculates the rotation phase error of said capstan motor on the basis of the difference in the time data temporarily held in said hold means for the reference signal and the control signal.

9. An apparatus according to claim 8, wherein said hold means comprises first, second and third hold means for holding the time data for the speed signal, the reference signal and the control signal, respectively.

10. An apparatus according to claim 8, further comprising storage means for storing the time data temporarily held in said hold means; and wherein said frequency calculating means calculates the rotation frequency of said capstan motor in accordance with the interval of time of generation of the speed signal based on the time data stored in said storage means, and said phase error calculating means calculates the rotational phase error of said capstan motor on the basis of the difference in the time data stored in said storage means for the reference signal and the control signal.

11. An apparatus according to claim 7, wherein said providing means includes analog-to-digital conversion means for converting the reproduced signal detected by said level detecting means to a digital signal; and further comprising digital-to-analog conversion means for converting the control data calculated by said control data calculating means to an analog signal for application to said capstan motor.

* * * * *